United States Patent Office 2,785,816
Patented Mar. 19, 1957

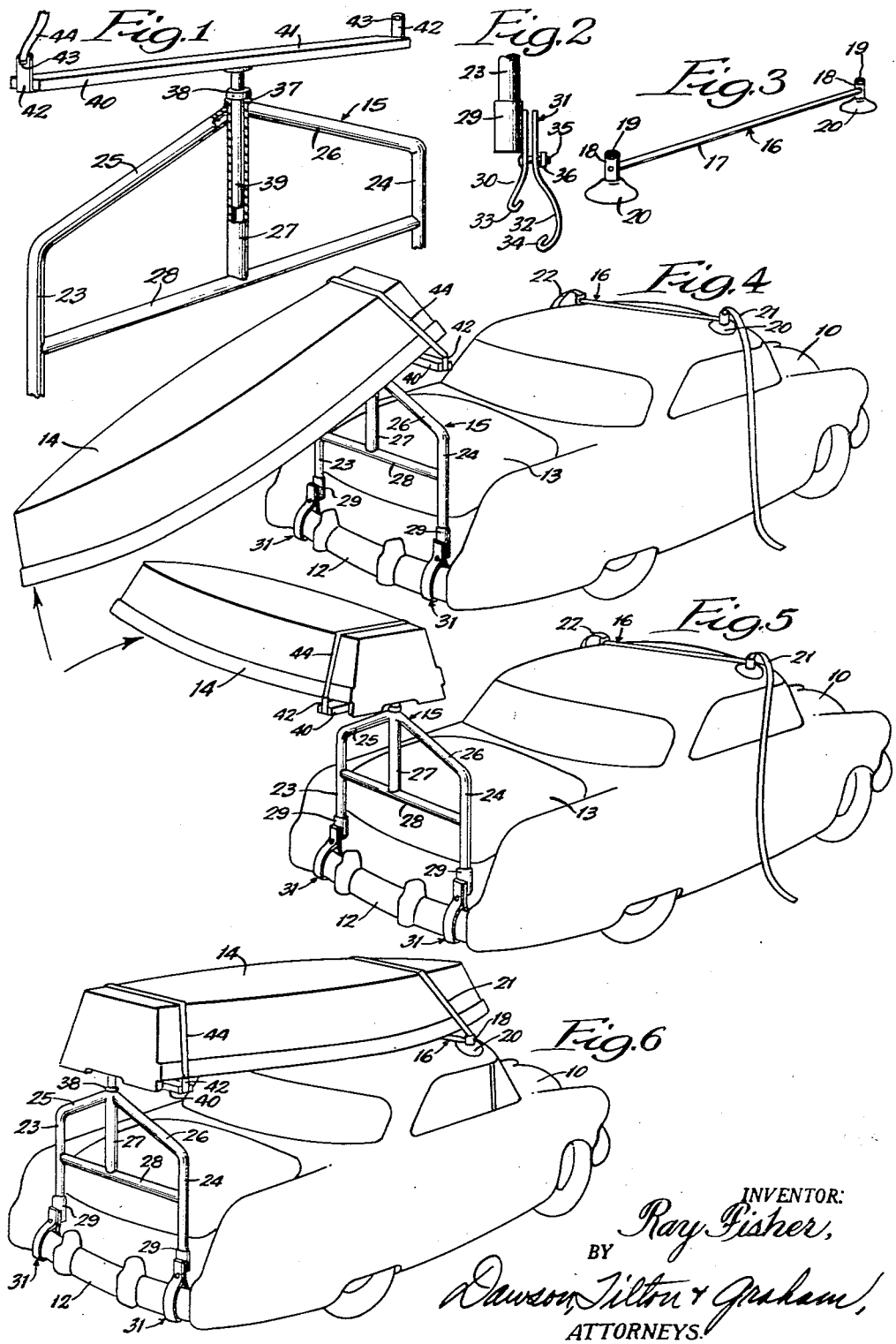

2,785,816

LOADER AND CARRY-ALL FOR AUTOMOBILES

Ray Fisher, Alma, Mich.

Application October 18, 1954, Serial No. 462,813

3 Claims. (Cl. 214—450)

This invention relates to a loader and carry-all for automobiles, and more particularly to a device for loading and thereafter carrying articles that may be bulky and heavy along the roof of an automobile. The device is useful, for example, in loading and carrying boats but is, of course, useful with other articles such as doors, lumber, etc.

A number of devices have been proposed that are useful in combination with automobiles for carrying boats and similar articles thereon. None of these devices have been completely satisfactory in all respects. Some have not enabled one man by himself to load a boat onto the automobile, and therefore lack convenience. Others have not provided the requisite rigidity and articles carried thereby have shifted either relative to the structure supporting the same or with respect to the automobile—the support structure shifting therewith. Still others are arranged so that unless exceptional care is used in loading bulky articles, there is great danger of scratching or marring the automobile surfaces. Many have hinged parts which are subject to wear and are, unless properly and carefully used, sensitive to the road use of an automobile.

It is, accordingly, an object of this invention to provide a loader and carry-all device useful with automobiles which will overcome the disadvantages present in prior art structures. Another object of the invention is to provide a loading device for use with automobiles which will enable a man without help to load relatively bulky and relatively heavy objects onto an automobile without danger to himself and without damaging the surfaces of the automobile. Another object is in the provision of a carry-all device adapted for use with automobiles and which has no hinged parts, and while enabling a man to quickly and easily load articles thereon provides a rigid and firm support therefor, which is substantially insensitive to the ordinary movements of an automobile.

A further object is in providing a carrier adapted to be secured to the rear bumper of an automobile and which is arranged to have secured thereon one end of a relatively bulky article such as a boat, the carrier being arranged to provide swinging movement of the article supported thereon whereby the free end portion of that article can be swung into alignment with and over the roof of an automobile. Additional objects and advantages will appear as the specification proceeds.

An embodiment of the invention is illustrated in the accompanying drawings, in which—

Figure 1 is a broken perspective view of the carrier and in which parts thereof are shown in section; Figure 2 is a broken side view in elevation of the clamp structure; Figure 3 is a perspective view of the forward support member; Figure 4 is a perspective view of the carrier and support member in position upon an automobile and which shows one step in loading an article; Figure 5 is a perspective view similar to that of Figure 4 but showing a subsequent step in the loading operation; and Figure 6 is a perspective view again similar to that in Figures 4 and 5 but showing a boat in carrying position upon an automobile.

Illustrated in Figures 4 through 6 is an automobile 10 which may be conventional in all respects, and is equipped with the usual roof or top 11 and a rear bumper 12. In the specific illustration given, the automobile is a sedanette having an elongated trunk deck 13, but it should be appreciated that the invention is useful with other types of automobiles and may be employed as successfully with 2 and 4-door sedans in which the passenger compartment extends rearwardly and substantially to the rear bumper thereof.

As has been brought out heretofore, the loader and carry-all device is useful with numerous different types of articles, some of which may be large and heavy, but since particular utility is found in the use of the device as a loading and carrying device for boats, a boat 14 is shown in Figures 4 through 6. The boat 14 may also take on any desired shape and may vary considerably in size, and will ordinarily be one taken from the class that is usually and customarily carried along the roof of an automobile.

The apparatus comprises a loader and rear carrier member 15 which is adapted to be secured to the rear bumper 12 of the automobile 10, as is shown in Figures 4 through 6, and a forward support member 16 which is to be secured to the roof 11 of the automobile. The forward support member 16 may take varied forms, but in the specific illustration constitutes an elongated bar 17 equipped at each end with a bracket 18 having an eye 19 extending therethrough and being fixed to a rubber suction cup 20 at its lower end. The suction cups 20 are intended to be secured to the roof 11 of the automobile, and function in the usual manner of a suction cup to bring about that result. Since suction cups are well known in the art, a further description thereof will not be set forth. The eyes 19 of the members 18 are adapted to receive the straps or flexible belts 21 and 22, at least one of which will be provided with a buckle that will receive and secure the complementary strap member. The function of the member 16 is to support one end of an article such as the boat 14, and to secure the same to the roof 11. Therefore, the member 16 may be altered in form and may be designed so as to best suit the limitations posed by the particular automobile.

The carrier 15 comprises a pair of spaced-apart standards 23 and 24 which have inwardly and upwardly inclined end portions 25 and 26 which are rigidly secured to a central post 27. The post 27 at its lower end is fixed to a transversely extending cross piece 28 that at each end is rigidly secured to the standards 23 and 24. As is seen best in Figure 2, each of the standards has at the lower end thereof a collar 29 that is threadedly mounted upon the end portion of the standard or is otherwise affixed thereto. Carried by the collar 29 is one jaw 30 of a clamp 31 which is also provided with a second jaw 32. The jaws 30 and 32 are preferably provided at their lower ends respectively with the hooks 33 and 34 which are adapted to receive the horizontal edges of the bumper 12 therebetween. The jaws 30 and 32 may be drawn together to firmly secure the same upon the bumper 12 by means of the bolt 35 and nut 36 which is threadedly received thereon.

The center post 27 is hollow and is provided at its upper end with a laterally extending annular flange 37 which supports thereon a bearing member 38. Extending downwardly through the bearing 38 and into the hollow post 27 is a shaft 39 which is pivotally received within the post 27 and may be axially slidable therein. Fixedly secured to the shaft 39 at its upper end is a transverse support bar 40 which preferably provides a relatively flat upper surface 41. The bar 40 at each end thereof carries a rigid upwardly extending bracket or fastener 42 which at its upper end is provided with an eye 43 therethrough. A flexible strap or belt 44 is secured at one end to one of the brackets 42, and at its other end is adapted to extend through the eye 43 of the opposite bracket and should, as will be apparent, be equipped with a buckle or other fastening device so that the belt may be drawn tightly about the boat 14 or other article, as is shown in Figures 4 through 6.

In use of the device the carrier 15 is mounted upon the bumper 12 of an automobile and is secured in this position by drawing the jaws of the clamp 31 tightly about the bumper. The forward support member 16 is mounted upon the roof 11 of the automobile by pressing the suction device 20 downwardly thereon to partially evacuate the same. The straps 21 and 22 which form a part of the forward support device depend along the sides of the automobile, and the rear strap 44 is positioned so that it drops downwardly along one end of the bar 44.

The article to be loaded onto the automobile, and which will be secured to and carried by the members 15 and 16, will have one end thereof hoisted onto the bar 40 as is shown in Figure 4, and the strap 44 will be drawn tightly thereabout. Next, the opposite end of the boat 14 will be lifted upwardly to elevate the boat throughout its length to a point slightly above the level of the roof 11. The forward end of the boat will then be swung laterally through the position illustrated in Figure 5, and finally into general axial alignment with the automobile 10, and will then be lowered onto the transverse bar 17 provided by the forward support member 16. The straps 21 and 22 will then be drawn over the forward end of the boat and will be tightened thereagainst to firmly anchor that end of the boat upon the forward support member 16. If necessary, the rear strap 44 may then be re-tightened to insure a rigid mounting of the rear end portion of the boat upon the bar 40 of the carrier 15.

In the loading operation, a man without help of others can with facility place a boat or other article in position upon an automobile. In such operation it is only necessary to lift about half the weight of the article, for first one end thereof is lifted and then placed upon the bar 40, and thereafter only the forward end of the article is lifted to swing the article into position upon the forward support member 16. The article is not pushed forwardly over the surfaces of the auto, and the only movement relative to the roof 11 is through the comparatively short arc that extends generally transversely thereacross.

When in position upon the carrier 15 and forward support member 16, the boat is rigidly anchored to the automobile and cannot shift longitudinally with respect thereto for both the forward and rear supports provide a rigid mounting therefor. That is, there are no hinged parts which would tend to yield, for example, when the automobile is accelerated or decelerated or when it is turned from side to side. The only movable structure provided by either the front or rear support members is the shaft 39 which is rotatably supported in the tubular post 27. Since this movement is pivotal, no wear on these parts is caused by the road movements of the automobile. If desired, the shaft 39 may be adjustable relative to the post 27 so that the elevation of the bar 40 can be made to conform to the roof height of any given automobile.

It will be appreciated that in unloading, the steps enumerated will be carried out in reverse order, and after releasing the straps 21 and 22 the forward end portion of the boat will be swung laterally and rearwardly and then lowered into the position shown in Figure 4. The strap 44 will then be released and the rear end portion of the boat lowered from the bar 40.

While in the foregoing specification an embodiment of the invention has been set out in considerable detail for purposes of illustration, it will be readily apparent to those skilled in the art that numerous changes may be made without departing from the spirit or principles of the invention.

I claim:

1. In a boat loader and carrying device of the character described, a carrier equipped with clamps adapted to be rigidly secured to the rear bumper of an automobile, a single support post rotatably mounted upon said carrier and extending upwardly therefrom, a transverse support bar for supporting one end portion of a boat, said bar being mounted upon the upper end of said rotatable support post for swinging movement with respect to said carrier and to said automobile, and a forward support member adapted to be mounted upon the roof of an automobile in substantially parallel alignment with said transverse support bar for supporting the opposite end portion of said boat, whereby, in loading a boat upon an automobile one end of said boat is first anchored upon said transverse bar and the opposite end of said boat is then lifted and swung horizontally along a substantially 180° arc until said opposite end is disposed upon said forward support member.

2. In combination with an automobile, a carrier adapted to be rigidly secured to the rear bumper of an automobile, a single vertical support post rotatably mounted upon said carrier and extending upwardly therefrom, a transverse support bar for supporting one end portion of a boat thereon, said bar being mounted intermediate the ends thereof upon the upper end of said rotatable support post for swinging movement with respect to said carrier and to said automobile, and a forward support member adapted to be mounted upon the roof of an automobile in substantially parallel alignment with said transverse support bar for supporting the opposite end portion of said boat, whereby, a boat may be loaded upon and unloaded from said automobile by swingably supporting one end portion of the boat upon said transverse bar while the opposite end portion thereof is moved into and away from supported position upon said forward support member.

3. In combination with an automobile, a carrier of tubular construction equipped with clamps adapted to be rigidly secured to the rear bumper of an automobile, a single vertical support post rotatably mounted upon said carrier and extending upwardly therefrom, a transverse support bar for supporting one end portion of an elongated article, said bar being centrally secured to the upper end of said rotatable post and being swingable through a substantially 180° arc between two positions each extending transversely to the longitudinal axis of said automobile, and a forward support member for supporting the opposite end portion of said elongated article, said member being adapted to be mounted upon the roof of said automobile in substantially parallel alignment with said transverse support bar when said bar is in either of its two positions whereby, in loading an article upon an automobile, one end portion of said article may be supported by said transverse bar when the same is in one of said positions and said article and bar may then be swung through a substantially 180° arc to position the opposite end portion of the article upon said forward support member.

References Cited in the file of this patent

UNITED STATES PATENTS

| | | |
|---|---|---|
| 758,989 | Lucas | May 3, 1904 |
| 804,761 | Otterman | Nov. 14, 1905 |
| 1,211,381 | Alden | Jan. 9, 1917 |
| 1,681,936 | Hillstrom | Aug. 28, 1928 |
| 2,446,092 | Lait | July 27, 1948 |
| 2,486,316 | Morse et al. | Oct. 25, 1949 |
| 2,600,082 | Sumner | June 10, 1952 |